(12) United States Patent
Jorgenson et al.

(10) Patent No.: US 12,526,070 B1
(45) Date of Patent: Jan. 13, 2026

(54) LOW LATENCY DIGITAL REBROADCAST OF SIGNALS WITH FEC AND INTERLEAVING

(71) Applicant: Rockwell Collins, Inc., Cedar Rapids, IA (US)

(72) Inventors: Mark B. Jorgenson, Kanata (CA); Robert W. Johnson, Ottawa (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 112 days.

(21) Appl. No.: 18/545,596

(22) Filed: Dec. 19, 2023

(51) Int. Cl.
| | | |
|---|---|---|
| *H03M 13/00* | (2006.01) | |
| *H03M 13/11* | (2006.01) | |
| *H04L 1/00* | (2006.01) | |
| *H04L 1/1812* | (2023.01) | |

(52) U.S. Cl.
CPC ......... *H04L 1/004* (2013.01); *H03M 13/1111* (2013.01); *H04L 1/1812* (2013.01)

(58) Field of Classification Search
CPC ..... H04L 1/0061; H04L 1/004; H04L 1/1812; H04L 1/0046; H04L 1/1816
See application file for complete search history.

(56) References Cited

U.S. PATENT DOCUMENTS

| | | | |
|---|---|---|---|
| 6,922,806 B2 | 7/2005 | Gibson et al. | |
| 7,313,206 B2 | 12/2007 | Kolze | |
| 7,979,775 B2 | 7/2011 | Yu et al. | |
| 8,363,747 B2 | 1/2013 | Liu et al. | |
| 9,143,785 B2 | 9/2015 | Limberg | |
| 9,893,842 B2 * | 2/2018 | Eder | H04L 1/1812 |
| 11,539,565 B2 * | 12/2022 | Eger | H04L 1/0041 |
| 11,871,248 B2 * | 1/2024 | Lee | H04W 16/32 |
| 2023/0171144 A1 | 6/2023 | Tang et al. | |

FOREIGN PATENT DOCUMENTS

| | | |
|---|---|---|
| CN | 113726697 A | 11/2021 |
| EP | 2101421 B1 | 8/2014 |
| EP | 3876455 B1 | 7/2023 |
| WO | 2008140827 A1 | 11/2008 |

* cited by examiner

*Primary Examiner* — Esaw T Abraham
(74) *Attorney, Agent, or Firm* — Suiter Swantz IP

(57) ABSTRACT

A radio system receives a forward error correction encoded signal for retransmission. The system performs symbol detection to produce soft decisions for the encoded bits. The soft decisions are used in the generation of the rebroadcast signal prior to any deinterleaver or error correction decoding, and the rebroadcast signal is transmitted. The system may determine if soft decisions exceed some threshold of confidence; if so, the detected bits may be used in the generation of the rebroadcast signal instead of the soft decision bit values. The system may enter a low latency mode based on some criteria such as a type of application, or a minimum necessary latency.

20 Claims, 6 Drawing Sheets

LOW LATENCY DIGITAL REBROADCAST OF SIGNALS WITH FEC AND INTERLEAVING

BACKGROUND

Radio rebroadcast systems extend the range or the crossbanding of signals from one frequency band to another by receiving a signal on one channel and rebroadcasting the same signal on another channel. Analog systems detect the presence of the signal on-channel in the channel being monitored and then translate that analog signal to the rebroadcast channel, rebroadcasting the signal with only a slight delay, with transmit and receive signals on-air at the same time. An analog rebroadcast system is illustrated in FIG. 1A.

Such rebroadcasting imparts very little latency but any noise or distortion that has been introduced into the signal is propagated into the rebroadcast signal. Receivers that are detecting the rebroadcast signal are receiving a signal that has all of the noise and distortion from the initial transmission and reception by the rebroadcasting radio receiver. Furthermore, subsequent noise and distortion may be introduced by the channel from the rebroadcast transmitter to the receivers.

Digital rebroadcast systems offer better performance than analog systems because the signal is detected and the information content is resolved at the rebroadcast station before being transmitted on the rebroadcast channel. This avoids the compounding effect of adding noise and distortion, and allows operation in channels that cannot be supported with analog rebroadcast. However, the rebroadcast receiver must detect the information bits of the message before they can be retransmitted.

In some cases, where the data is encoded with a forward error correction code with an interleaver, a substantial latency can be introduced by the rebroadcast system. A digital rebroadcast system that incorporates forward error correction is illustrated in FIG. 1B. Applications that require low latency become untenable with the addition of the interleaver delays.

SUMMARY

In one aspect, embodiments of the inventive concepts disclosed herein are directed to a radio system that receives a signal for retransmission. The system performs receiver processing to undo the effect of the channel up to the point of symbol detection. Any one of: the processed receive signal; hard decisions on symbols mapped to bits; or soft decisions for the encoded bits; may be used to generate the rebroadcast signal, and the rebroadcast signal is transmitted.

In a further aspect, the system may determine if the received signal vector for symbol exceeds some threshold of confidence for detection; if so the corresponding symbol from the M-ary alphabet in use may be used in the generation of the corresponding symbol in the retransmission.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
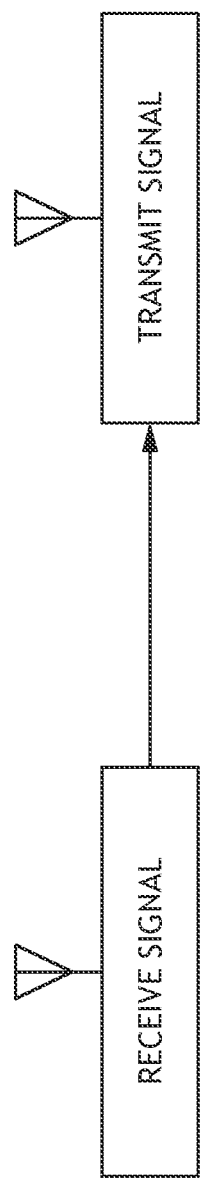
FIG. 1A (PRIOR ART) shows a block diagram of analog rebroadcast system.
Figure 1B:
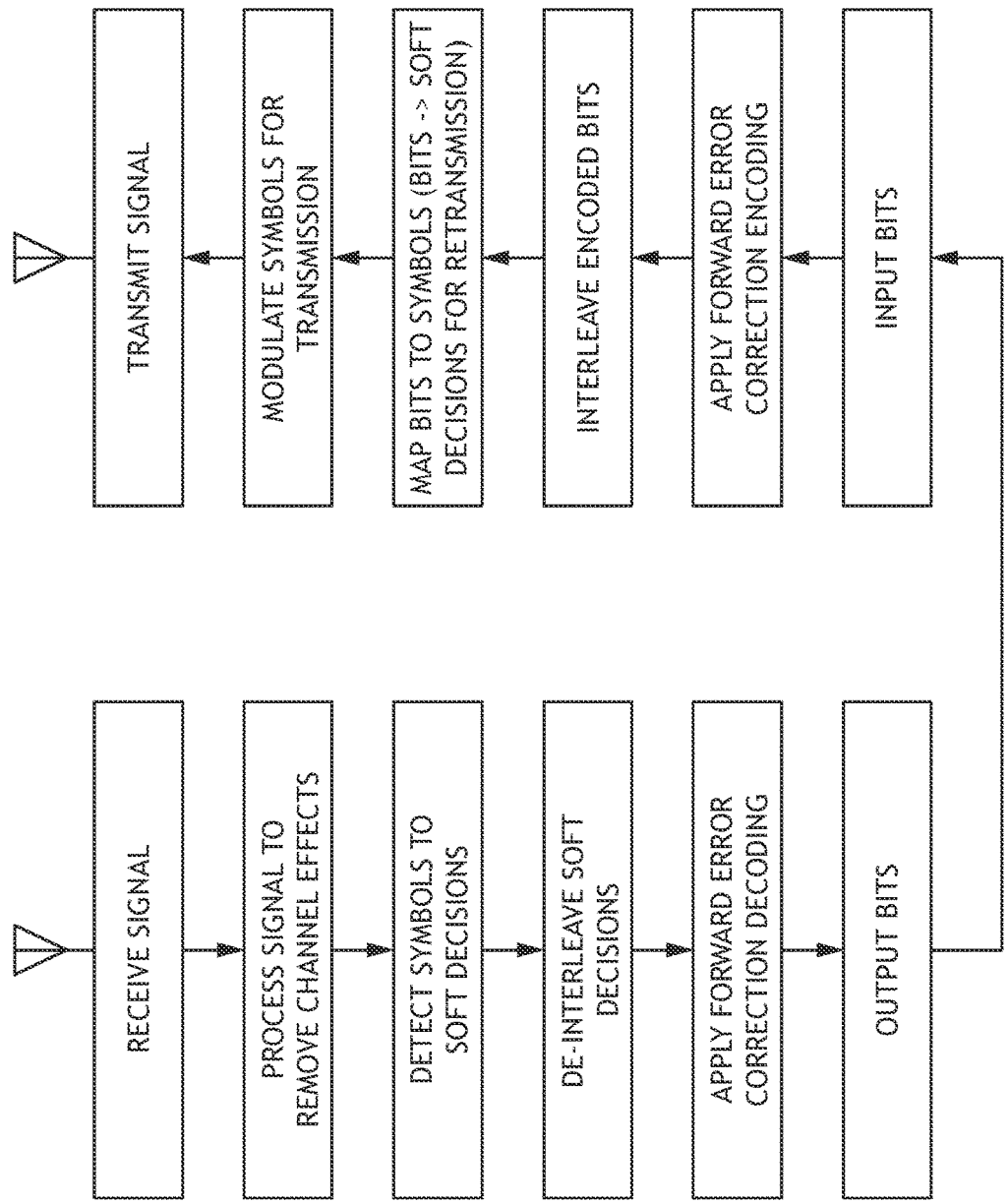
FIG. 1B (PRIOR ART) shows a digital rebroadcast system that incorporates forward error correction.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a radio system that receives a signal for retransmission. The system performs receiver processing to undo the effect of the channel up to the point of symbol detection. Any one of: the processed receive signal; hard decisions on symbols mapped to bits; or soft decisions for the encoded bits; may be used to generate the rebroadcast signal, and the rebroadcast signal is transmitted. The system may determine if the received signal vector for symbol exceeds some threshold of confidence for detection; if so the corresponding symbol from the M-ary alphabet in use may be used in the generation of the corresponding symbol in the retransmission.

Figure 2:
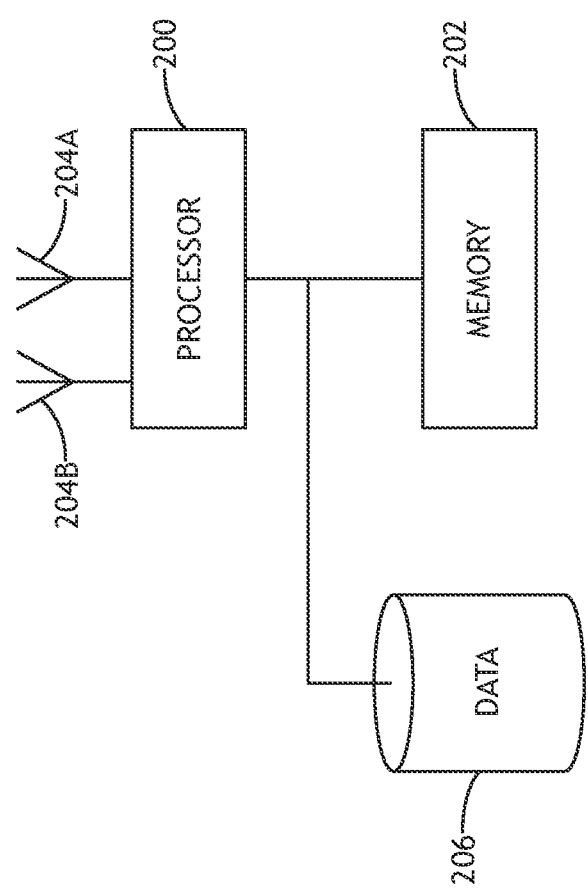
FIG. 2 shows a block diagram of a system suitable for implementing an exemplary embodiment.
Figure 3:
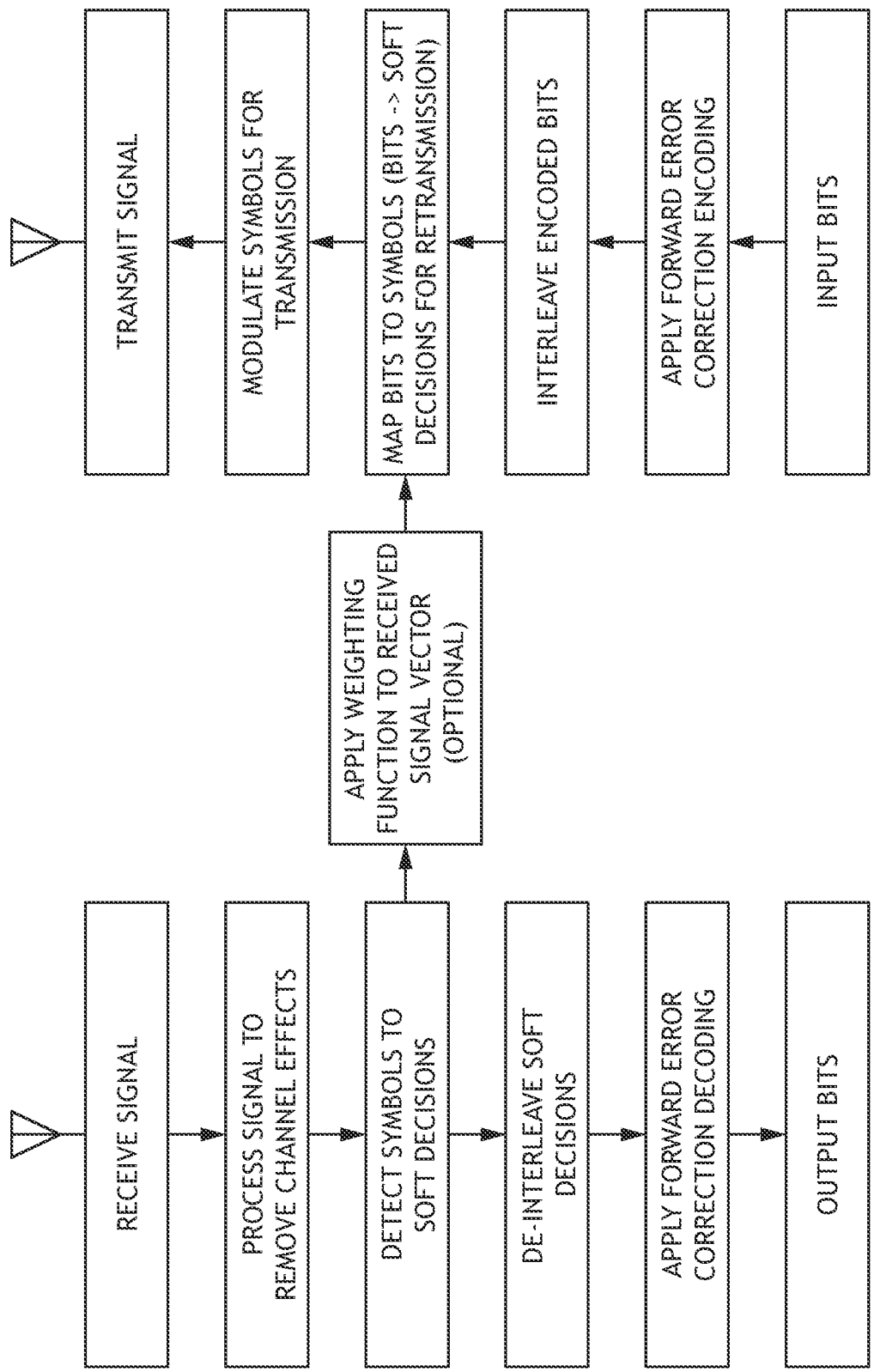
FIG. 3 shows a block diagram of signal flow in a process according to an exemplary embodiment.

Referring to FIGS. 2 and 3, a block diagram of a system suitable for implementing an exemplary embodiment and a flowchart of signal flow are shown. The system, which may be embodied in a mobile platform, node in a mesh network, etc., includes a processor 200, memory 202 connected to the processor 200 for embodying processor executable code, and at least one antenna 104A, 204B for sending and receiving transmission to other radios, nodes, or the like: in a typical embodiment, the system may include a transmit antenna 204A and a receive antenna 204B. The processor 200 is configured to receive a transmission for rebroadcast. When the processor 200 determines that transmission is for rebroadcast, the processor 200 begins the process of detecting and decoding the transmission.

First, the processor 200 detects individual data symbols on the channel. In some waveforms, there are elements of the waveform that are defined and which are known to both transmitter and receiver. The description here describes actions with respect to the data symbols and not any known features of the waveform. The alphabet of symbols being used by the transmitter is either known to the receiver or can be determined by the receiver from other aspects of the transmission. The transmitter uses an alphabet with a mapping between the bits to be sent and the symbol chosen. The processing required to detect the transmitted symbols may involve sophisticated signal processing in order to undo effects arising from the channel. Equalization or a rake receiver architecture may be used to incorporate multipath components into the receiver's estimate of the received signal vector that is used to determine which symbol from the alphabet the transmitter has sent. The received signal vector can be viewed as an estimate of the analog signal that would correspond to the signal received after passing through a perfect channel between the transmitter and the receiver. The receiver normally uses the received signal vector to generate soft decisions for forward error correction encoded bits. However, in at least one embodiment, the receive signal vector may be used directly to generate symbols for retransmission. Encoded bits cannot be transmitted until the interleaver is filled on the transmit side and decoding does not occur until after an interleaver has been filled on the receive side. Waiting for the decoding of the interleaved bits results in a delay in digital rebroadcast systems. The methods described avoid that delay.

Figure 4B:
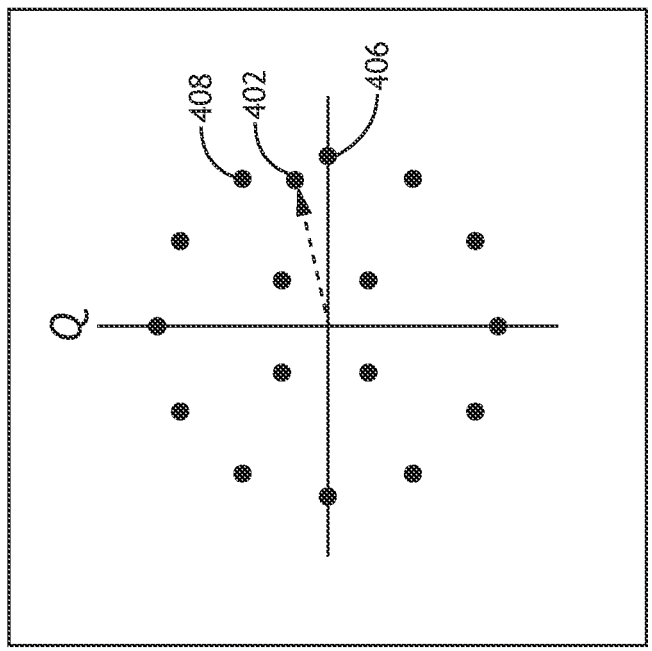
FIG. 4B shows an exemplary received signal vector for a single symbol with a 16 QAM symbol alphabet in an exemplary embodiment.
Figure 4A:
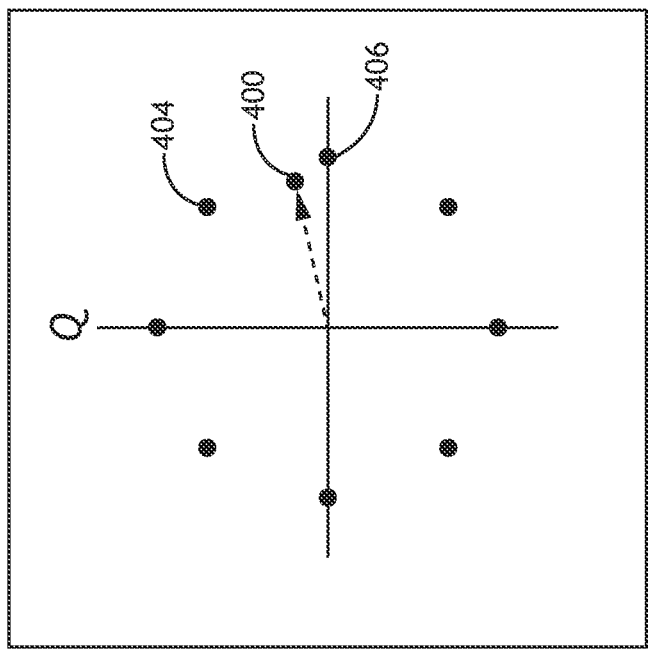
FIG. 4A shows an exemplary received signal vector for a single symbol with an 8PSK symbol alphabet in an exemplary embodiment.

In at least one embodiment, the processor 200 performs receiver processing to the point where the receiver has reduced the effects of the channel to the extent possible (this might involve equalization or a RAKE receiver for example) and the receiver has produced outputs, which may be in the form of a vector signal, to make decisions on the received symbols. For example, for a PSK or QAM modulated signal, the vector used to determine the received symbol may be the in-phase/quadrature (I/Q) components aligned in time to the specific symbol (illustrated in FIGS. 4A and 4B wherein a signal point 400 in FIG. 4A represent a received signal vector for an 8PSK constellation, and a signal point 402 in FIG. 4B represent the same received signal vector for a 16QAM constellation). For other modulations, the vector signal might be the components of orthogonal basis functions (Walsh modulation for example). The intent of the rebroadcast path that is shown from the receiver, from processing the signal to remove channel effects, to modulating symbols for transmission, is to provide an input to that stage of the transmission chain that will result in the same output signal from processing the signal to remove channel effects in a subsequent receiver receiving the signal over a channel that doesn't distort the signal or add noise. In the example of PSK/QAM signals where I/Q samples are employed, the modulator would be driven by the received I/Q values rather than the I/Q values associated with the constellation points 406 closest to the received signal vector. This preserves the information in the received signal vector associated with the quality of the signal for use by a subsequent forward error correction decoding step. In FIGS. 4A and 4B, the signal points 400, 402 represent the same received signal vector. In FIG. 4A, the received signal vector is relatively close to a constellation point 406 (as compared to the next closest constellation point 404) indicating that the confidence in the detection to the nearest constellation point 406 would be relatively high. In this case, soft decision information is less important. The same received signal vector, if received when the 16QAM constellation shown in FIG. 4B was in use, would be nearly equidistant from the two closest constellation points 406, 408. In this case it becomes very important to preserve the received signal vector and not simply the closest constellation point 406. With this configuration, one of the 4 bits encoded in 16-ary constellation is very nearly a random guess by the receiver. Error correction codes that make use of soft decision information can perform much better than those that only rely on hard decisions.

A refinement of this approach is to apply a function to the received signal vector prior to using it in generating the corresponding symbol for retransmission. The simplest such function would be to threshold the receive signal vector such that if it falls within a specified signal space distance of a constellation point, the constellation point is used in the retransmission This allows signals received with high signal to noise ratio and where errors would not be made in the detection to be retransmitted without accumulating noise with each retransmission. In the limit, when the threshold is expanded so that constellation point is always chosen, this corresponds to mapping the received signal vector to the closest symbol in the alphabet, equivalent to making a hard decision on the received symbol. This approach is not limited to PSK/QAM constellation types that have been used to illustrate the concept but may also be extended to M-ary modulations in general. The distance from the received signal vector to each of the M symbols in the alphabet is evaluated and when the received signal vector is not close enough to any symbol in the alphabet to be confident that it is correct, the received signal vector is used to generate the retransmitted signal associated with that symbol. Where the received signal vector is within a threshold distance of a symbol, that symbol from the alphabet is then used for generating the corresponding symbol in the retransmitted signal. Functions that alter the received signal vector based on its relationship to the symbols in the alphabet can be used in place of the simple thresholding described.

Figure 5:
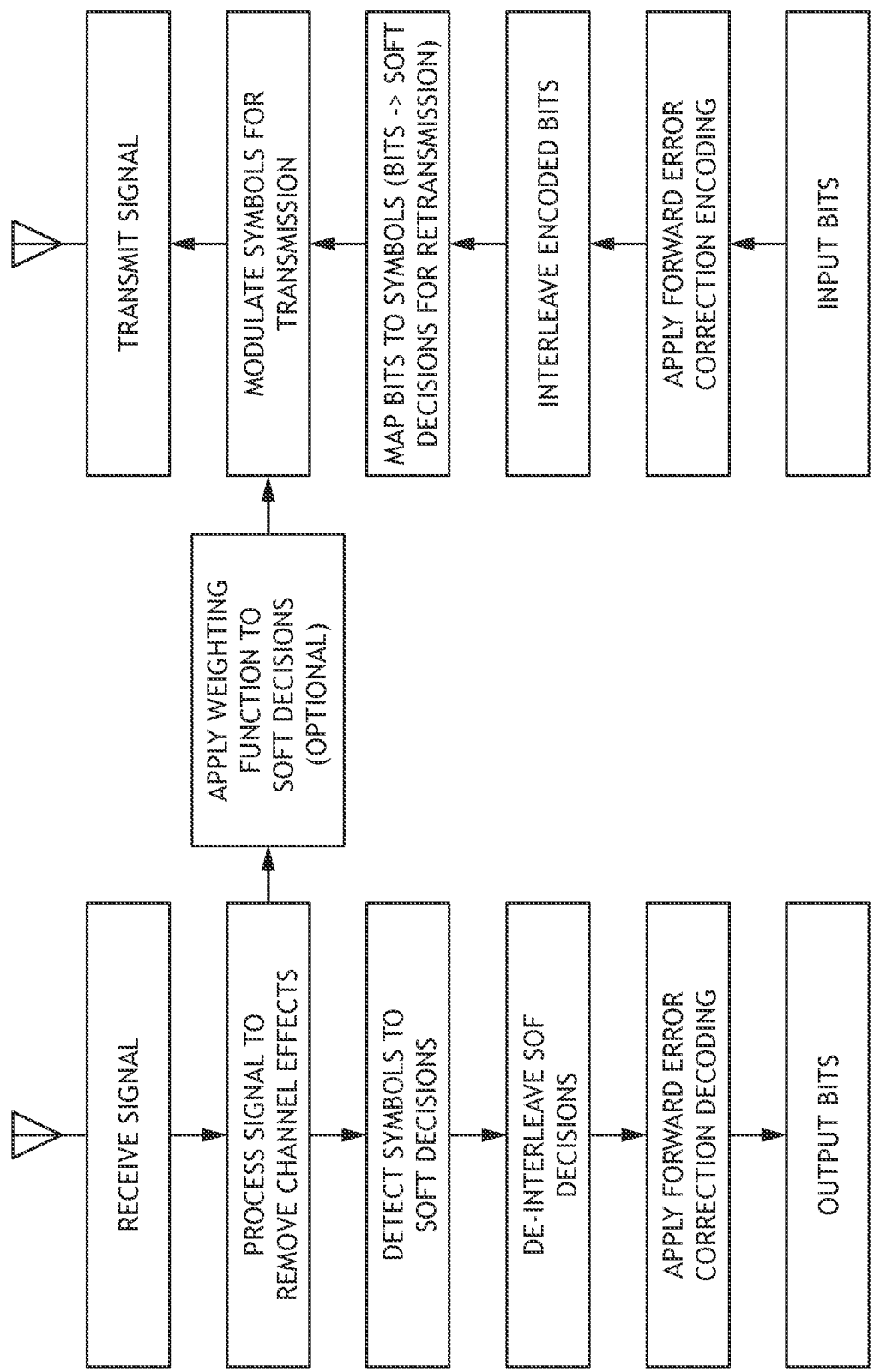
FIG. 5 shows a block diagram of signal flow in a process according to an exemplary embodiment.

In at least one embodiment, the processor 200 halts the detection once the forward error correction encoded symbols have been detected and soft decisions have been determined for the symbols. The soft decisions are then used in the generation of a rebroadcast transmission as shown in FIG. 5. The use of soft decisions preserves the best estimate of the detection metric at the receiver thereby retaining information about the quality of the detected signal while avoiding additional delay. A weighting function may be applied to the soft decisions before they are employed to generate symbols for retransmission. The weighting function may consist of a threshold whereby bits with sufficiently high confidence are assigned the highest possible level of confidence. As the level of confidence required is reduced to its lowest limit this becomes equivalent to making hard decisions. Alternatively, a function that modifies the soft decision values prior to their use in generating symbols for retransmission may increase or decrease the confidence of individual soft decisions based on one of: a compression or expansion of the soft decision metric as would be produced by applying a sigmoid function; the soft decision values of other bits in the same symbol; and/or the soft decision values of other bits in symbols in proximity to the soft decision. The rebroadcast transmission and soft decisions may be stored in a data storage element 206 temporarily.

In one exemplary embodiment, where digital voice signals are being rebroadcast, radios may use standardized waveforms. A traditional digital rebroadcast will incur delays associated with the interleavers in the standardized waveforms. The MIL-STD-188-110A serial tone waveform uses a 0.6 s block interleaver, and a digital rebroadcast will incur a 0.6 s deinterleaving delay on the reception and a 0.6 s interleaving delay on the retransmission. Such delay is in addition to the delays for the initial transmission and the reception by the end-user. The overall latency is too high to support voice operation. Embodiments of the present invention would eliminate the interleaving delays and would only incur the additional delay associated with detecting blocks of transmitted data (on the order of 20 ms) plus sufficient buffering to allow the conveyance of the detected symbols to the rebroadcast transmitter; much less than the delays associated with the interleaver.

It may be appreciated that a communication system according to the present disclosure may also receive retransmitted signals. The system may operate equally well when retransmitting signals that have already been retransmitted, applying any of the approaches outlined for retransmission of an original signal.

In at least one embodiment, the application of embodiments of the present disclosure may be triggered by specific applications. For example, where the application is a voice application, the system may enter a mode corresponding to the present disclosure. Alternatively, applications may communicate a necessary latency. Where the latency is less than what is possible with interleaving, the system may enter a mode corresponding to the present disclosure.

Embodiments of the present disclosure obtain most of the benefits of digital rebroadcast while minimizing the latency associated with rebroadcasting a forward error correction encoded transmission. Embodiments may be most beneficial for applications where multipath is present and analog rebroadcasting would compound the multipath by effectively convolving the two channels (initial transmission to the rebroadcast receiver and rebroadcast transmitter to the end receivers).

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least two antennas; and
   at least one processor in data communication with a memory storing processor executable code for configuring the at least one processor to:
   receive a modulated signal via at least one of the at least two antennas;
   determine that the signal is for retransmission based on at least one of: a header field in the signal, a network control message, or a predetermined operating mode;
   process the received signal to undo channel effects by applying at least one of equalization or RAKE reception and generate a received signal vector representing estimated symbol values after channel compensation;
   determine, for each symbol interval, either (i) a reference symbol point within a predetermined distance threshold of the received signal vector from a plurality of reference symbol points of a known M-ary modulation alphabet, or (ii) the received signal vector itself when no reference symbol point meets the threshold, to generate a retransmission signal; and
   retransmit the signal corresponding to the received signal vector using an antenna of the at least two antennas other than the antenna in use for receiving the signal.

2. The computer apparatus of claim 1, wherein the at least one processor is further configured to:
   determine those elements of the received signal vector for which a confidence in the assignment of that element to a particular symbol in the alphabet exceeds a predetermined level of confidence; and
   include a corresponding symbol from the alphabet in the generation of the retransmission signal instead of the received signal vector element for that symbol.

3. The computer apparatus of claim 1, wherein the at least one processor is further configured to:
   detect bits in the signal; and
   generate symbols for retransmission via the detected bits.

4. The computer apparatus of claim 3, wherein the at least one processor is further configured to:
   detect soft decisions for the bits in the symbols; and
   generate symbols for retransmission based on the soft decisions.

5. The computer apparatus of claim 4, wherein the at least one processor is further configured to:
   apply a function to threshold the soft decisions based on a confidence;
   generate symbols for retransmission based on a maximum confidence soft decision for soft decisions within the threshold; and
   retain soft decision values for other bits to generate symbols for retransmission.

6. The computer apparatus of claim 1, wherein:
   the at least one processor is further configured to apply a function to modify the received signal vector to effect at least one change to underlying soft decision information; and
   generating the retransmission signal comprises using the modified vector while preventing noise and minimizing peak to average power.

7. The computer apparatus of claim 1, wherein the received signal is a retransmitted signal from a node in a network.

8. A method of low latency retransmission comprising:
   receiving a modulated signal;
   determining that the signal is for retransmission based on at least one of: a header field in the signal, a network control message, or a predetermined operating mode;
   processing the received signal to undo channel effects by applying at least one of equalization or RAKE reception and generate a received signal vector representing estimated symbol values after channel compensation;
   comparing the received signal vector to a plurality of reference symbol points of a known M-ary modulation alphabet to identify, for each symbol interval, either (i) a reference symbol point within a predetermined distance threshold of the received signal vector or (ii) the received signal vector itself when no reference symbol point meets the threshold, to generate a retransmission signal; and
   retransmitting the signal corresponding to the received signal vector.

9. The method of claim 8, further comprising:
   determining that an application requires a threshold level of latency; and
   entering a low latency mode comprising the steps of processing the signal to undo channel effects and generate the received signal vector or equivalent and determining the one or more nearest symbols in the alphabet to generate the retransmission signal.

10. The method of claim 8, further comprising:
    detecting bits in the signal; and
    generating symbols for retransmission via the detected bits.

11. The method of claim 10, further comprising:
    detecting soft decisions for the bits in the symbols; and
    generating symbols for retransmission based on the soft decisions.

12. The method of claim 11, further comprising:
    applying a function to threshold the soft decisions based on a confidence;
    generating symbols for retransmission based on a maximum confidence soft decision for soft decisions within the threshold; and
    retaining soft decision values for other bits to generate symbols for retransmission.

13. The method of claim 8, further comprising applying a function to modify the vector to effect at least one change to underlying soft decision information, wherein generating the retransmission signal comprises using the modified vector while preventing noise and minimizing peak to average power.

14. The method of claim 8, wherein a single antenna is configured for simultaneous transmission and reception.

15. A communication system comprising a plurality of nodes, each node comprising:
    at least two antennas; and
    at least one processor in data communication with a memory storing processor executable code for configuring the at least one processor to:
       receive a modulated signal via at least one of the at least two antennas;
       determine that the signal is for retransmission based on at least one of: a header field in the signal, a network control message, or a predetermined operating mode;
       process the received signal to undo channel effects by applying at least one of equalization or RAKE reception and generate a received signal vector representing estimated symbol values after channel compensation;
       determine, for each symbol interval, either (i) a reference symbol point within a predetermined distance threshold of the received signal vector from a plurality of reference symbol points of a known M-ary modulation alphabet, or (ii) the received signal vector itself when no reference symbol point meets the threshold, to generate a retransmission signal; and
       retransmit the signal corresponding to the received signal vector using an antenna of the at least two antennas other than the antenna in use for receiving the signal.

16. The communication system of claim 15, wherein the at least one processor is further configured to:
    determine those elements of the received signal vector for which a confidence in the assignment of that element to a particular symbol in the alphabet exceeds a predetermined level of confidence; and
    include a corresponding symbol from the alphabet in the generation of the retransmission signal instead of the received signal vector element for that symbol.

17. The communication system of claim 15, wherein the at least one processor is further configured to:
    detect bits in the signal; and
    generate symbols for retransmission via the detected bits.

18. The communication system of claim 17, wherein the at least one processor is further configured to:
    detect soft decisions for the bits in the symbols; and
    generate symbols for retransmission based on the soft decisions.

19. The communication system of claim 18, wherein the at least one processor is further configured to:
    apply a function to threshold the soft decisions based on a confidence;
    generate symbols for retransmission based on a maximum confidence soft decision for soft decisions within the threshold; and
    retain soft decision values for other bits to generate symbols for retransmission.

20. The communication system of claim 15, wherein the at least one processor is further configured to choose between a full digital rebroadcast and an intermediate rebroadcast based on an application being supported or a delay duration.

* * * * *